H. A. SNYDER.
COMBINATION BLACKBOARD AND TABLE.
APPLICATION FILED JULY 6, 1909.
948,905.
Patented Feb. 8, 1910.
3 SHEETS—SHEET 1.
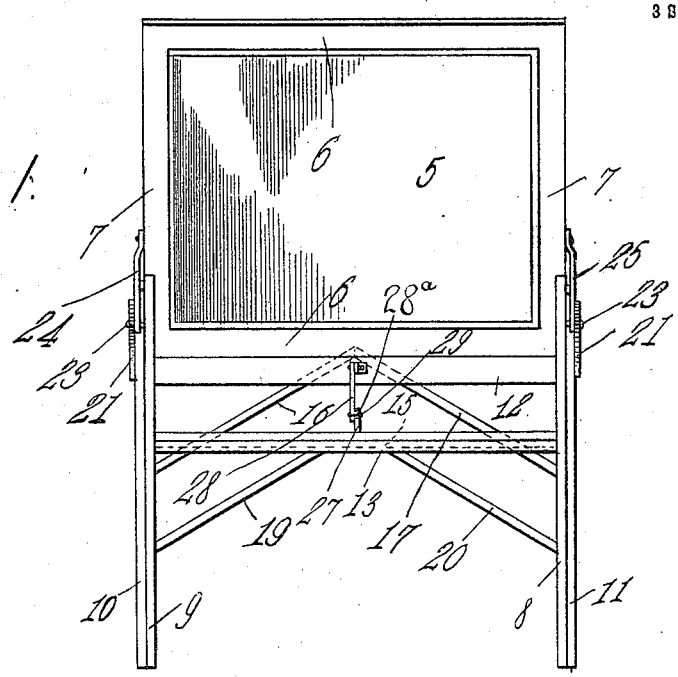
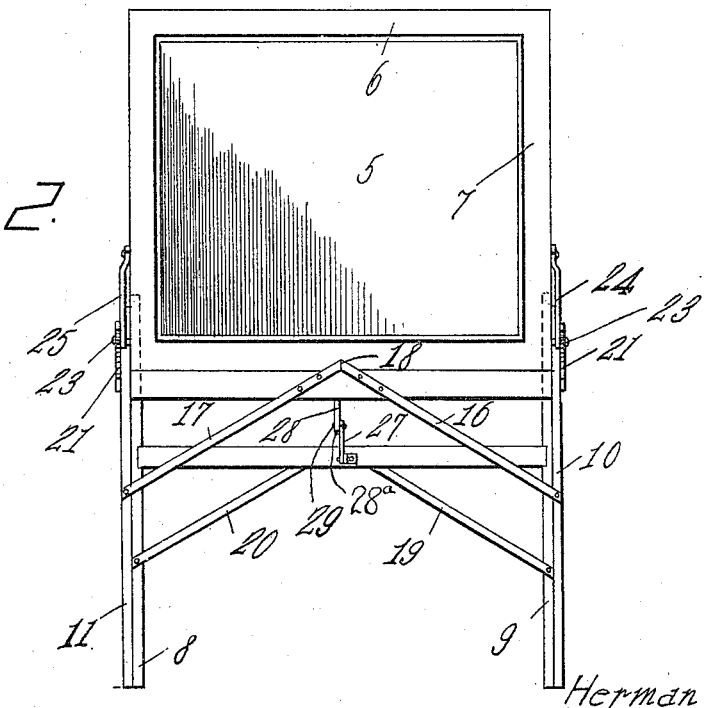
Inventor
Herman A Snyder H. A. SNYDER.
COMBINATION BLACKBOARD AND TABLE.
APPLICATION FILED JULY 6, 1909.
948,905.
Patented Feb. 8, 1910.
3 SHEETS—SHEET 2.
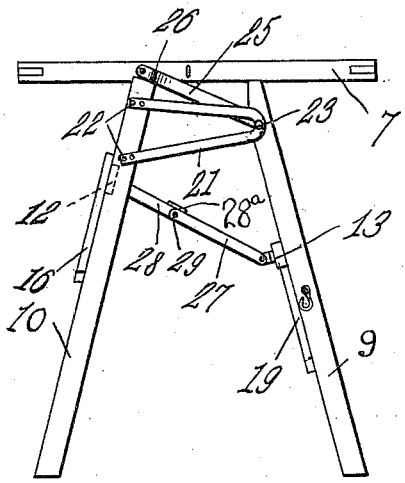
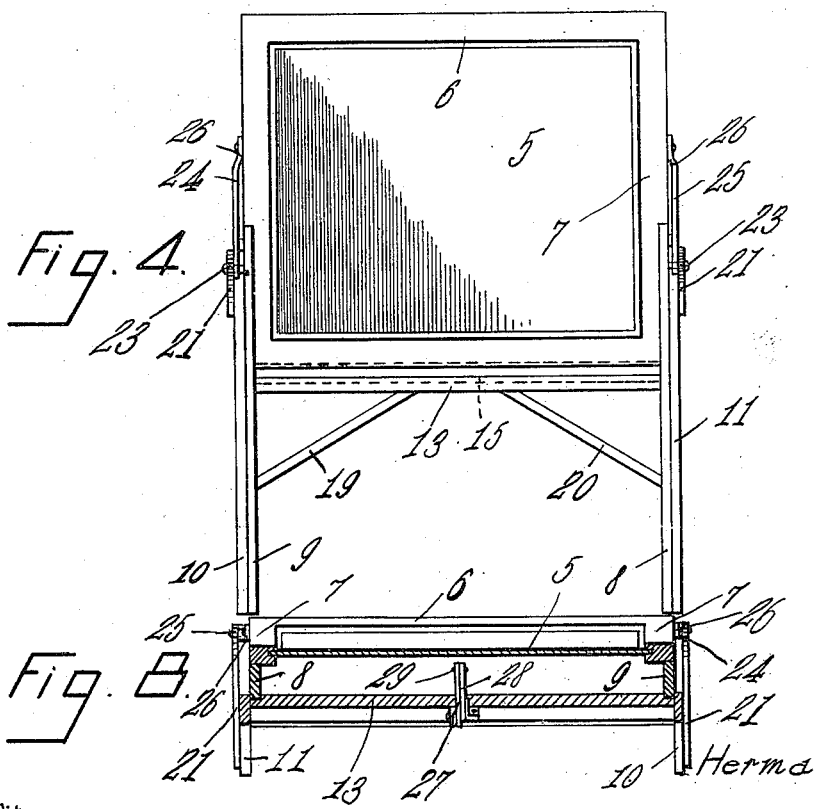
Inventor
Herman A. Snyder H. A. SNYDER.
COMBINATION BLACKBOARD AND TABLE.
APPLICATION FILED JULY 6, 1909.
948,905.
Patented Feb. 8, 1910.
3 SHEETS—SHEET 3.
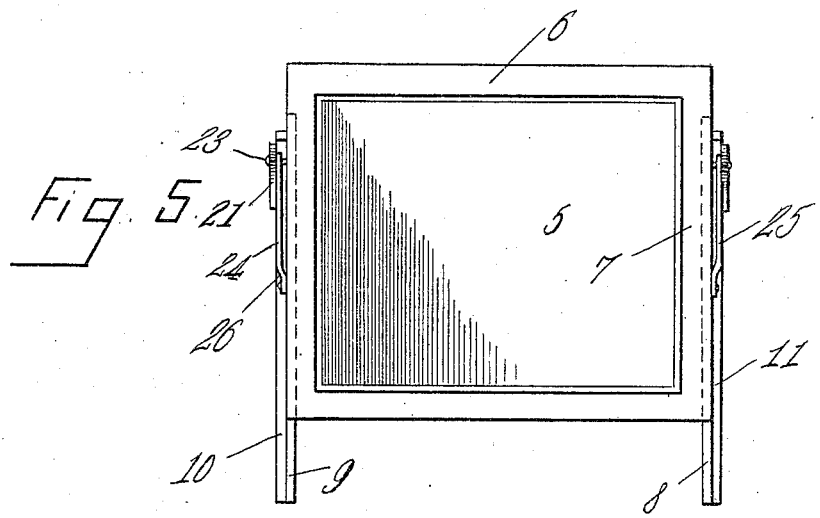
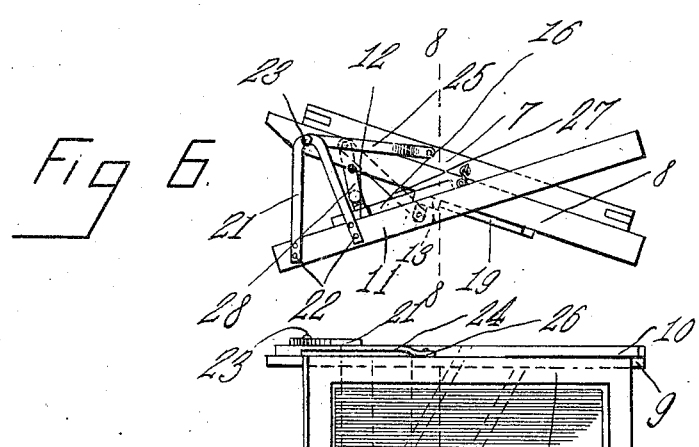
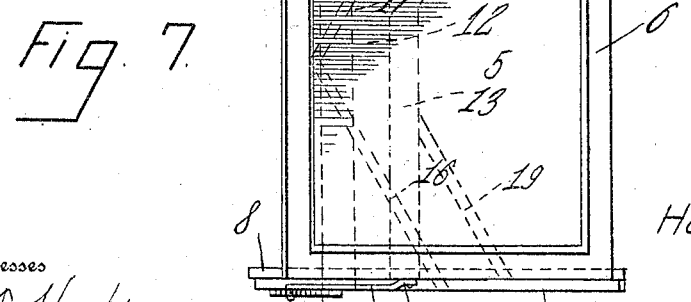
Witnesses
C. R. Hardy
John A. Donegan
Inventor
Herman A. Snyder
By Chandler & Chandler
Attorneys

UNITED STATES PATENT OFFICE.

HERMAN A. SNYDER, OF SLATINGTON, PENNSYLVANIA.

COMBINATION BLACKBOARD AND TABLE.

948,905.  Specification of Letters Patent.  Patented Feb. 8, 1910.

Application filed July 6, 1909. Serial No. 506,122.

*To all whom it may concern:*

Be it known that I, HERMAN A. SNYDER, a citizen of the United States, residing at Slatington, in the county of Lehigh, State of Pennsylvania, have invented certain new and useful Improvements in Combination Blackboards and Tables; and I do hereby declare the following to be a full, clear, and exact description of the invention, such as will enable others skilled in the art to which it appertains to make and use the same.

This invention relates to improvements in black boards and more particularly to the supports therefor.

It has for its object the provision of a combination black board which may be used for writing purposes or employed as a study-table.

Another object is the provision of a support for the black board so arranged that the black board may be adjusted on the support to various heights.

A further object is the provision of a support adapted to be folded substantially parallel with the black board so that the latter and support will occupy a comparatively small space when not in use.

With these and other objects in view as will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size and minor details of the device may be made without departing from the spirit or sacrificing any of the advantages of the invention.

In the accompanying drawings forming part of the specification:—Figure 1 is a front elevation of the device showing the black board in one position. Fig. 2 is a rear view showing the black board in the same position and also the braces which prevent the board from movement in one direction. Fig. 3 is a side elevation of the device and showing the black board adjusted in a horizontal position and arranged for a table. Fig. 4 is a front elevation showing the black board adjusted to a different height from that shown in Fig. 1. Fig. 5 is a front elevation showing the black board adjusted to its lower-most position. Fig. 6 is an end elevation of the device folded. Fig. 7 is a plan view of the same. Fig. 8 is a sectional plan view on the line 8—8 of Fig. 6.

Similar numerals of reference are employed to designate corresponding parts throughout.

The black board is designated by the numeral 5 and is incased in an oblong frame, the sides of which are designated by the numeral 6 and the ends of which are designated by the numeral 7. A double pair of supporting legs are provided for the black board, the said legs being all of one height, or substantially so. What will subsequently be termed the front pair of supporting legs are designated by the numerals 8 and 9, and the rear legs by the numerals 10 and 11. The rear legs 10 and 11 are spaced apart a trifle farther than the front legs so that the latter may fold between the rear legs. The rear legs are held in spaced relation by means of a cross piece 12, the opposite ends of which are fixedly secured to the opposed inner faces of the legs and arranged adjacent their upper ends. The front legs are held in spaced relation by means of a cross piece 13, arranged at the intermediate portions of said legs and secured to their opposed inner faces and disposed below the plane of the cross piece 12 of the rear legs. The cross piece 13 is provided on its upper face with a longitudinal groove 15 which constitutes a chalk trough. The rear legs 10 and 11 are braced by means of a pair of metallic struts 16 and 17, the outer ends of which are secured to the intermediate portion of the rear side of the legs 10 and 11, while the inner ends are secured to the outer face of the cross piece 12 with their terminals bearing one upon the other as shown at 18 and projecting a trifle above the upper side of the cross piece 12, as clearly shown in Figs. 1 and 2. The front legs 8 and 9 are braced by means of a pair of metallic struts 19 and 20, the outer ends of which are secured to the lower end portions of the legs and the upper ends of which are secured to the intermediate portion of the cross piece or chalk trough, as clearly shown in Figs. 1 and 2. If desired, a pair of angular brackets may be employed to connect the front legs 8 and 9 with the chalk trough in lieu of the metallic struts 19 and 20. The upper ends of the legs are fixedly held in spaced relation by U shaped brace bars designated in general by the numeral 21. This member is preferably formed of a single piece of metal, the free terminals of the limbs of which are fixedly secured to the outer faces of the rear legs 10 and 11 by means of bolts or rivets 22. The opposite or connected ends of the brace bars are provided with orifices which receive pins 23 projecting laterally from the upper end portions of the front leg. With this construction it is obvious that the lower end portion of the front legs 8 and 9 may be folded over and between the lower end portions of the rear legs 10 and 11, the front legs turning on the pins 23 as a pivot.

Connection between the black board and legs is established by means of a pair of connecting rods 24 and 25. These members are preferably formed of metal and as shown in the drawings each of these connecting rods has one end pivoted to the end of the frame at a point to one side of the longitudinal center of the frame while its opposite end is provided with an opening for the reception of the pivot pin 23, the said opposite ends being disposed between the brace rods and supporting legs. Each connecting rod is provided adjacent its point of connection with the frame of the black board with a lateral off-set 26, this off-set forming a shoulder which bears on the upper end of the rear legs when the frame is in a horizontal position, as shown in Fig. 3. The lengths of the brace rods 24 and 25 are such that when the board is in a horizontal position the ends of the connecting rods which are connected to the ends of the frame will be in a plane with the longitudinal centers of the rear legs 10 and 11, or substantially so. It might here be stated that the length of the frame is somewhat less than the length of the supporting legs and the width of the frame corresponds exactly to the distance between the outside faces of the front legs 8 and 9.

When the supporting legs are in unfolded position they are held braced by means of a link consisting of the jointed sections 27 and 28. The outer ends of these sections are pivoted to the opposed inner faces of the cross pieces 12 and 13 and at the intermediate portions thereof, while their inner ends are connected by a pivot bolt 29. The links 27 and 28 are of unequal lengths, the shorter link 28 being secured to the upper-most cross piece 12 and provided on one side with a laterally extending lug 28$^a$ which prevents movement of the links beyond a certain point. The links are arranged to move upwardly, and thus it can be seen when it is desired to fold the legs the links are first moved slightly upward after which the legs may be folded, as before described.

When it is desired to use the device as a table the frame is brought to a horizontal position until its opposite ends bear on the upper ends of the front legs 8 and 9 and the lateral off-sets of the connecting rods bear on the upper ends of the rear legs 10 and 11. From this position the frame and black board may be adjusted to the position shown in Figs. 1 and 2, by first raising the frame bodily until that side projecting in advance of the rear legs 10 and 11 is brought to a point between said rear legs and said front legs, after which the frame is turned to a vertical position and moved bodily downwardly and inwardly until the side bears on the upper edge of the cross piece 12 connecting the rear legs. It will be observed when the parts are in this position that the side of the frame will abut against the projecting terminals of the struts 16 and 17, the latter preventing further rearward movement of the frame. When it is desired to adjust the frame and board to a lower position as shown in Fig. 4, the frame is first lifted bodily from the horizontal position shown in Fig. 3 and then swung so as to cause the end which is farthest from its pivotal axis to move up over and then down between the rear legs 10 and 11 and on to the front cross piece or chalk trough 13. From this position the board may be adjusted to a still lower position by lifting it clear of the upper end of the supporting legs and thence depressing it over the front legs to a position parallel with and bearing on the said legs, as clearly shown in Fig. 5. In this position the parts may be folded as before described.

From the foregoing it will be seen that I have provided a device which is exceedingly simple in structure and comparatively inexpensive to manufacture, embodying few parts and these so arranged that the danger of derangement will be reduced to a minimum.

Having thus described my invention what is claimed as new, is:—

1. The herein described combined black board and table comprising a pair of front legs, a cross piece connecting them, a pair of rear legs spaced sufficiently far apart to permit the front legs to fold between them, a cross piece connecting the rear legs, brace bars secured to and extending forwardly from the upper portions of the rear legs, the upper portions of the front legs being pivotally connected to the said brace bars, a flexible link connecting the cross pieces of the front and rear legs, a board, and a pair of links pivotally connected to the upper portions of the front legs and to opposite sides of said board, the width of said board being such as to adapt it to bear upon the upper ends of the front legs and to bear between the upper portions of the rear legs and the said links which connect the board to the front legs having means to bear on the upper ends of the rear legs, the board being hence adapted to be disposed in horizontal position, in inclined position with one side between the upper portion of the rear legs and bearing on the cross piece thereof; in lowered inclined position with one side bearing on the cross piece of the front legs and also in folded position against the front sides of the front legs, substantially as set forth.

2. The herein described black board and table comprising a pair of front legs having a supporting device connecting them together, a pair of rear legs having a supporting device connecting them together, connecting devices projecting forwardly from the upper portions of the rear legs and to which the front legs are pivotally connected near their upper ends, a board and links pivotally connected thereto and also connected to the front legs near the upper ends of the latter.

3. In a combined black board and table, a double pair of supporting legs having cross pieces, one of which is arranged above the plane of the other, a top, and a rod having its opposite ends pivoted to the ends of the top and one pair of legs and serving to permit said top to occupy a horizontal position with respect to said legs and to be turned so as to bring one side of said top in position to bear on either of said cross bars.

In testimony whereof, I affix my signature, in presence of two witnesses.

HERMAN A. SNYDER.

Witnesses:
CHAS. W. ENGLE,
ANNIE SIEGER.